(12) United States Patent
Becker et al.

(10) Patent No.: US 11,027,591 B2
(45) Date of Patent: Jun. 8, 2021

(54) SERVICE PORT CAP WITH CLICK LOCK

(71) Applicant: AirSept, Inc., Atlanta, GA (US)

(72) Inventors: Aaron Becker, Atlanta, GA (US); Ivo Ferreira, Atlanta, GA (US)

(73) Assignee: AIRSEPT, INC., Atlanta, GA (US)

(*) Notice: Subject to any disclaimer, the term of this patent is extended or adjusted under 35 U.S.C. 154(b) by 1030 days.

(21) Appl. No.: 14/026,420

(22) Filed: Sep. 13, 2013

(65) Prior Publication Data

US 2014/0069133 A1    Mar. 13, 2014

Related U.S. Application Data

(60) Provisional application No. 61/770,576, filed on Feb. 28, 2013, provisional application No. 61/700,522, filed on Sep. 13, 2012.

(51) Int. Cl.
*B60H 1/00* (2006.01)
*F16L 55/115* (2006.01)

(52) U.S. Cl.
CPC ..... *B60H 1/00485* (2013.01); *B60H 1/00571* (2013.01); *F16L 55/1157* (2013.01); *Y10T 29/49826* (2015.01)

(58) Field of Classification Search
CPC ..... B65D 45/322; B65D 45/32; F16L 55/115; F16L 55/1157; B60H 1/00485; B60H 1/00571; Y10T 29/49826
USPC ................... 220/228; 215/291; 137/383, 384
See application file for complete search history.

(56) References Cited

U.S. PATENT DOCUMENTS

| | | | | |
|---|---|---|---|---|
| 824,341 A * | 6/1906 | Cordes | ................. | B65D 45/322 |
| | | | | 215/272 |
| 2,512,501 A * | 6/1950 | Miller | ..................... | B64C 13/30 |
| | | | | 403/46 |
| 4,276,535 A * | 6/1981 | Mitsuyu | ................. | H01C 7/048 |
| | | | | 204/192.22 |
| 4,359,166 A * | 11/1982 | Dubach | ................ | B65D 45/322 |
| | | | | 215/272 |
| 4,516,684 A * | 5/1985 | Walter | ................. | B65D 45/322 |
| | | | | 215/272 |

(Continued)

FOREIGN PATENT DOCUMENTS

| | | | |
|---|---|---|---|
| DE | 1922966 | * | 11/1970 |
| DE | 3017839 | * | 11/1982 |

(Continued)

*Primary Examiner* — Anthony D Stashick
*Assistant Examiner* — Blaine G Neway
(74) *Attorney, Agent, or Firm* — Mark Young, PA

(57) ABSTRACT

A service port cap has a body configured to be snapped onto a service port such as an automotive air conditioning service port. The cap has an axial slot allowing the body to spread as it is pressed onto the service port. A rubberized plug in the top of the cap bears and seals against the end of the service port. Should a fluid leak develop through the service port, the rubberized plug maintains a seal until the pressure is sufficient to overcome the seal created by the plug. At this point, the leaking fluid is directed out through the axial slot in the cap. Thus, the cap does not blow off and the flow of leaking fluid is controlled so that it does not spew. One embodiment includes a locking ring that slides to a locking position to lock the cap onto a service or other port to form a fixed seal.

10 Claims, 8 Drawing Sheets

(56) References Cited

U.S. PATENT DOCUMENTS

| | | | | |
|---|---|---|---|---|
| 4,753,358 A | * | 6/1988 | Virca | B01L 3/50825 |
| | | | | 215/230 |
| 5,421,469 A | * | 6/1995 | Lee | B65D 55/0872 |
| | | | | 215/247 |
| 5,813,554 A | * | 9/1998 | Marangoni Graziani | ............ |
| | | | | B65D 45/322 |
| | | | | 215/274 |
| 2008/0196768 A1 | * | 8/2008 | Steffan | F16L 55/115 |
| | | | | 137/232 |
| 2011/0000872 A1 | * | 1/2011 | Aneas | B65D 45/322 |
| | | | | 215/273 |

FOREIGN PATENT DOCUMENTS

| FR | 001265048 A | * | 5/1961 |
|---|---|---|---|
| FR | 2429716 | * | 1/1980 |

* cited by examiner

SERVICE PORT CAP WITH CLICK LOCK

REFERENCE TO RELATED APPLICATIONS

Priority is hereby claimed to the filing dates of U.S. provisional patent application 61/700,522 filed on Sep. 13, 2012 and U.S. provisional patent application 61/770,576 filed on Feb. 28, 2013.

TECHNICAL FIELD

This provisional patent disclosure relates generally to caps and more specifically to caps for service ports such as the high side and low side service ports of an automotive air conditioning system used to check and add refrigerant and service the air conditioning system.

BACKGROUND

Automotive air conditioning systems include, among other things, a refrigerant compressor driven by the engine, a coil, and a fan. The compressor compresses refrigerant into a liquid state and the liquid is delivered through tubes to the coil. In the coil, the liquid refrigerant is evaporated, which cools the coil to low temperatures. The fan blows air across or through the cooled coil, which, in turn, cools the air. The cooled air is then directed into the vehicle. The evaporated refrigerant is returned to the compressor where it is re-compressed to liquid form and the cycle repeats.

Automotive and other air conditioning systems include service ports that communicate with the refrigerant through the tubing or at other locations. The ports have internal pressure valves that normally seal off the ports during operation of the air conditioning system to prevent the refrigerant from leaking through the service ports. Devices can be connected to these ports for a variety of purposes such as, for instance, checking the level of refrigerant in the system, evacuating the system in preparation for the introduction of new refrigerant, connecting diagnostic equipment, and introducing new refrigerant into the system. Most systems include at least a "low side" service port on the low pressure side of the compressor and a "high side" service port on the high pressure side of the compressor. These service ports typically have the same exterior profile with the high side port perhaps being of a larger diameter than the low side port.

Service ports of air conditioning systems are usually covered with caps that protect the ports from dirt, oil, and other contaminants. While the caps work well for this function, they can be problematic in the event of a refrigerant leak through the service port due to a failing internal pressure valve. The pressure of the leaking and perhaps evaporating refrigerant can blow a traditional cap off of the service port exposing the port to damage by dirt and debris. The blown off cap becomes a projectile that can lodge in unwanted locations or become a hazard. Further, the continuing leakage of the refrigerant can spew the refrigerant and oily lubricants therein onto other components in the engine compartment. Some service port caps have been designed with internal "pop off" valve structures that open before the pressure of the refrigerant within the cap is sufficient to blow off the cap itself. However, these pop off valves tend to direct escaping refrigerant away from the valve and toward other sensitive components within an engine compartment.

A need exists for a service port cap that will not be blown off by a refrigerant leak through the service port and that will not allow escaping refrigerant and lubricant to be spewed uncontrolled into the engine compartment of a vehicle. It is to the provision of such a service port cap and a related method that the present invention is primarily directed.

SUMMARY

U.S. provisional patent application 61/700,522 and U.S. provisional patent application 61/770,576 to which priority is claimed above are hereby incorporated by reference as if fully set forth herein.

Briefly described, a service port cap is disclosed for snapping onto service port of air conditioning systems, and particularly automotive air conditioning systems, to protect the service ports. The service port cap has an interior wall sized to fit over the nipple of a service port and an annular groove in the interior wall sized and positioned to snap onto the outwardly projecting annular flange of the service port. A rubberized plug is disposed in the interior top of the cap and at least one axially extending vent slot is formed in the side of the cap.

When the cap is pressed onto a service port, the axially extending vent slot spreads to allow the internal annular groove of the cap to snap over the annular flange of the service port. This brings the rubber plug into firm sealing contact with the end of the nipple to inhibit leakage of refrigerant from the service port until the pressure of the leaking refrigerant rises above a predetermined threshold. The threshold is blow the pressure required to blow off the cap from the service port. When the threshold is reached, the refrigerant is able to leak past the rubber plug. However, rather than spewing uncontrolled, the leaking refrigerant is directed safely along the interior wall of the cap and escapes through the vent slot on the side of the vent cap. Accordingly, cap blow offs are essentially eliminated and refrigerant and lubricant that does escape is contained and controlled so that it does not spew unchecked into the engine compartment. In one embodiment, a locking ring is slidably disposed around the outside of the vent cap. After snapping the vent cap onto a service port, the locking ring is slid down over the lower portion of the vent cap to prevent it from spreading out. This, in turn, locks the vent cap in place. This embodiment is particularly useful for high pressure ports.

These and other aspects, features, and advantages of the invention disclosed herein will become more apparent to the skilled artisan upon review of the detailed description set forth below taken in conjunction with the accompanying drawing figures, which are briefly described as follows.

DETAILED DESCRIPTION

Figure 1:
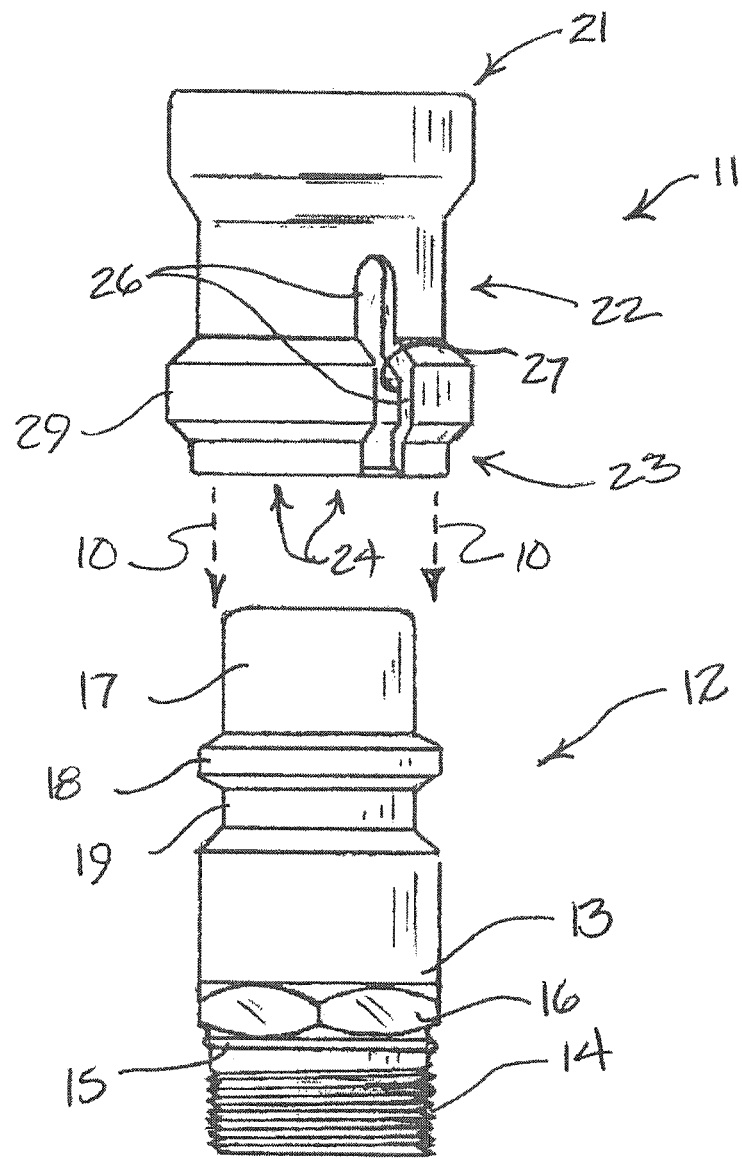
FIG. 1 is a side view of a service port of an automotive air conditioning system illustrating a service port cap according to the present disclosure being moved onto the service port.

Referring now in more detail to the drawing figures, wherein like reference numerals, where appropriate, indicate like parts throughout the several views, FIG. 1 illustrates a service port 12 of the type typically used with automotive air conditioning systems. The invention will be described in the context of such a service port, but it should be understood that the cap of this invention is not limited to service ports of automotive systems. Indeed, it may be used with similar service ports of home or commercial air conditioning systems or any service port with a configuration similar to that of service port 12.

The service port 12 includes a base portion 13 and a threaded bottom portion 13 configured to be threaded into an opening of the air condition system, either on the high side or the low side thereof. An O-ring 15 may be provided to form a seal when the service port is threaded into the opening. Hex nut 16 is formed in the base portion 13 to facilitate tightening of the service port with a wrench or socket. The service port 12 further includes a nipple 17 formed at its free end, an annular flange 18 at the bottom of the nipple 17, and a waist 19 below the annular flange. A passageway 25 (FIG. 2) is formed through the service port and at least a portion of the passageway is internally threaded for receiving a normally closed pressure valve sealing off the passageway. The service port is designed so that a female connector of filling, purging, diagnostic, or other equipment may be attached for servicing the air conditioning system. When such a female connector is attached, it is held in place by a spring, ball bearings, or other structures that snap into the waist 19. A plunger in the female connector depresses the internal pressure valve to open the valve for access to refrigerant in the air conditioning system.

A cap 11 according to the present invention is shown above the service port 12 with arrows 10 indicating that the cap is installed on the service port 12 by being pressed downwardly onto the port, as detailed below. The cap 11 comprises a top portion 21, a mid portion 22, and a bottom portion 23. An axially extending slit or slot 26 is formed in the cap and extends from the bottom portion 23 into the mid portion 22 as shown. An annular groove 27 is formed around the interior of the cap 11 adjacent its bottom portion and an outer annular bulge 29 accommodates the annular groove 27 and maintains the wall thickness of the cap across the annular groove.

The axial slot 26 allows the bottom and mid portions of the cap 11 to spread over the annular flange 18 of the service port as the cap is progressively pressed onto the service port. Eventually, the annular flange 18 of the service port snaps into the annular groove 27 on the inside of the cap 11, whereupon the lower and mid portions of the cap re-contract. This causes the annular groove 27 to contract around the annular flange to embrace the annular flange 18 tightly and thus hold the cap in place on the service port. It will thus be seen that the cap 11 is simply snapped onto the service port where it is held in place by the annular flange 18 captured within the annular groove 27 of the cap. The cap preferably is formed of a rugged but somewhat resilient polymeric material such as, for instance, PTFE, polyethylene, ABS plastic, PVC plastic or any other polymeric material with appropriate resiliency and ruggedness, or even a metal such as aluminum.

Figure 2:
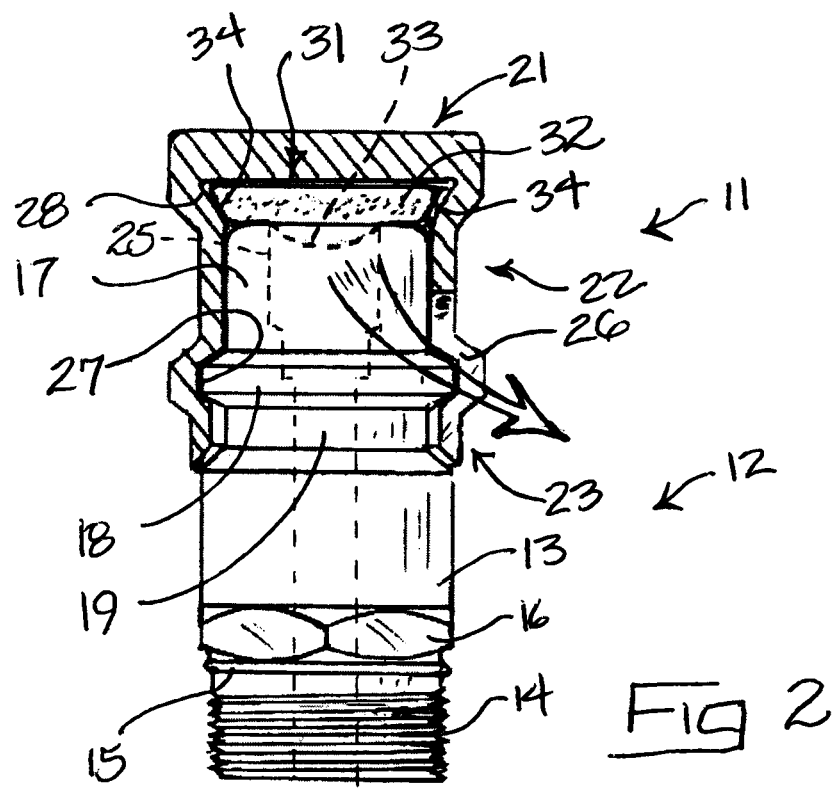
FIG. 2 is a partial cross sectional view showing the cap secured to the service port and illustrating the rubber plug sealingly engaging the end of the nipple of the port.

FIG. 2 illustrates the cap 11 in cross section snapped onto the service port 12. In this figure it can be seen that the service port 12 has an internal passageway 25 (shown in phantom line) that extends through the port from its bottom portion through its nipple. The annular flange 18 of the port is shown firmly engaged within the annular groove 27 of the cap 12 such that the cap is held reliably in place on the service port. However, the cap still can be removed for access to the service port with sufficient pulling force to disengage the annular flange from the annular groove. The interior of the cap at its top end 21 is formed with an outwardly flared annular seat 28.

A generally round rubber plug 31 is disposed within the flared annular seat 28 and is held in place by virtue of an outwardly flared periphery formed around the rubberized plug. The lower face of the rubberized plug is formed with a bulge 33 sized to extend partially into the internal channel of the service port. The plug 31 is sized such that when the cap 11 is snapped onto the service port 12, the rubberized plug is held firmly against the end of the nipple of the service port thereby forming a seal.

Normally, the pressure valve within the service port seals off the port when it is not being used so that no refrigerant escapes through the port. On occasion, however, the pressure valve fails and a refrigerant leak develops through the service port. If this happens, the rubberized plug 31 initially seals off the end of the service port to prevent escape of the leaking refrigerant. However, if the leak worsens, the pressure of the leaking refrigerant can overcome the seal created by the rubberized plug. In that event, the flow of the leaking refrigerant and lubricants contained therein is controlled by the cap so that it flows over the top edges and down the sides of the nipple to escape from the cap 11 through the axially extending slot 26. This is indicated by arrow 39 in FIG. 2. The resiliency of the material of the cap ensures that the seal formed by the rubberized plug is breached before the pressure of the leaking refrigerant is sufficient to dislodge the cap from the service port, which would create a blow off and turn the cap into a projectile. Accordingly, cap blow offs are prevented and leaking refrigerant and lubricant is directed through the side of the cap so that it does not spew uncontrolled into the engine compartment.

Figure 3:
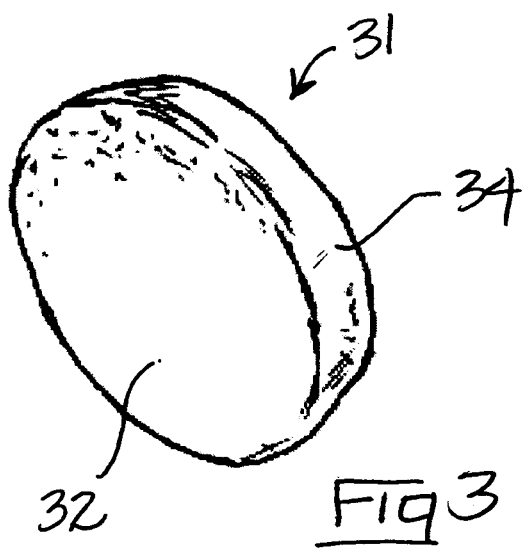
FIG. 3 is a perspective view of the rubber plug.
Figure 4:
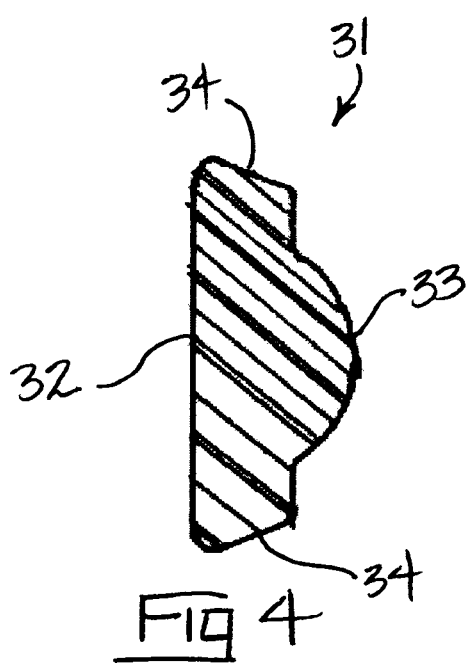
FIG. 4 is a cross sectional view of the rubber plug.

FIGS. 3 and 4 show one possible embodiment of the rubberized plug 31. The plug is generally round in shape and has a top face 32 and a periphery 34 that is formed with an outward flange corresponding to the configuration of the flanged seat 34 in the top of the cap. In this way, when the rubberized plug is pressed into the top of the cap 11, its flanged periphery engages within the flanged seat to hold the rubberized plug in place within the cap. As shown in FIG. 4, the lower face of the rubberized plug may be formed with a bulge 33 sized to extend slightly into the passageway 25 at the top of the nipple 17 when the cap is snapped onto the service port. The bulge 33 may or may not be included, however, and the inventors believe that a rubberized plug with a flat lower surface or a lower surface with some other configuration may function adequately. In any event, the improved cap of this invention is convenient, easy to snap into place, easy to remove for accessing the service port, eliminates cap blow off, and controls the direction of flow of refrigerant in the event of a leak.

Figure 5:
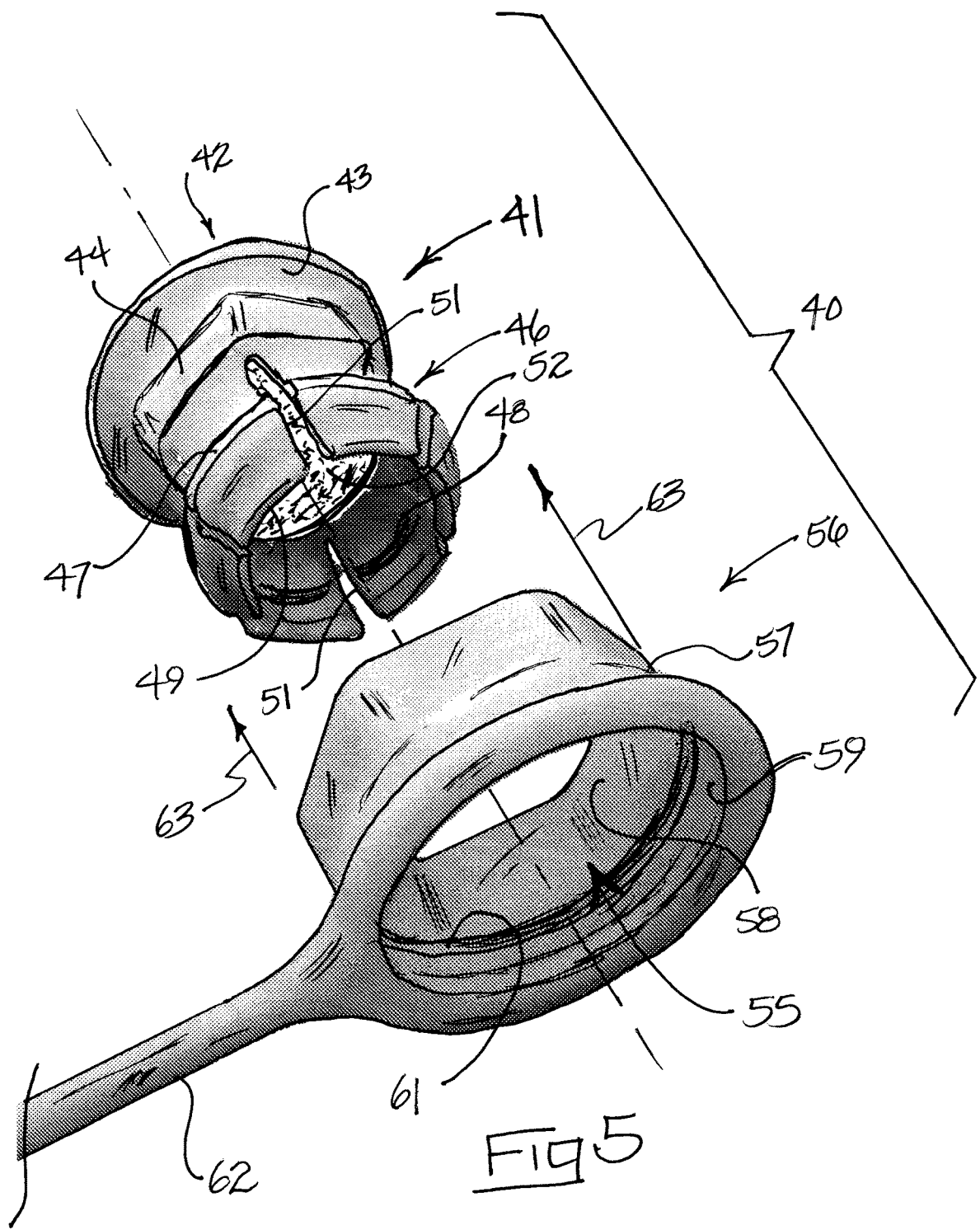
FIG. 5 is a perspective exploded view of a locking service port cap having a locking ring according to another embodiment of the invention.

FIGS. 5-8 illustrate an enhanced embodiment of the service port cap of this invention that is designed to snap onto a service port and then be locked in place to prevent it from dislodging. This embodiment is useful for high pressure service ports, but may be applied to low pressure service ports if desired. Referring to FIG. 5, a locking service port cap assembly 40 includes a cap 41 having a top portion 42, a mid portion 46, and a bottom portion 49. The top portion 42 includes a radially extending disc-shaped flange 43 and a shoulder 44, which, in this embodiment, is generally hexagonally shaped. The mid portion 46 of the cap 41 has a radially outwardly extending annular bulge 47 on the outside of the cap and a corresponding annular groove 48 on the inside of the cap. The mid and lower portions of the cap include a set of axially extending slits 51 that subdivide the cap into segments that, due to the slits, can flex inwardly and outwardly. A resilient or rubberized gasket 52 is disposed in the inside top portion of the cap for engaging and sealing against the end of a service port on which the cap 41 is pressed.

A locking ring 56 is configured to fit slidably onto the cap 41, but is shown exploded from the cap in FIG. 5. The locking ring 56 has a body 57 that defines a central passageway 55. One portion 58 of the passageway is generally hexagonally shaped to fit over the hexagonal shoulder 44 of the cap as described below. The other end is formed with an internal annular groove 61 sized and configured to receive the annular bulge 47 of the cap when the locking ring 56 is in position around the cap. A tether 62 may be attached to or formed with the locking ring 56 and may include another end (not shown) that mounts onto or around a service port or that attaches to the cap if desired. The tether prevents the locking ring and the cap from becoming separated and also prevents the pair, when joined together, from being accidentally dropped into an engine compartment when being installed or removed. As shown by arrows 63, the locking ring 56 can be slid onto the cap 41 and generally is retained there by the annular bulge 47 of the cap 41.

Figure 6:
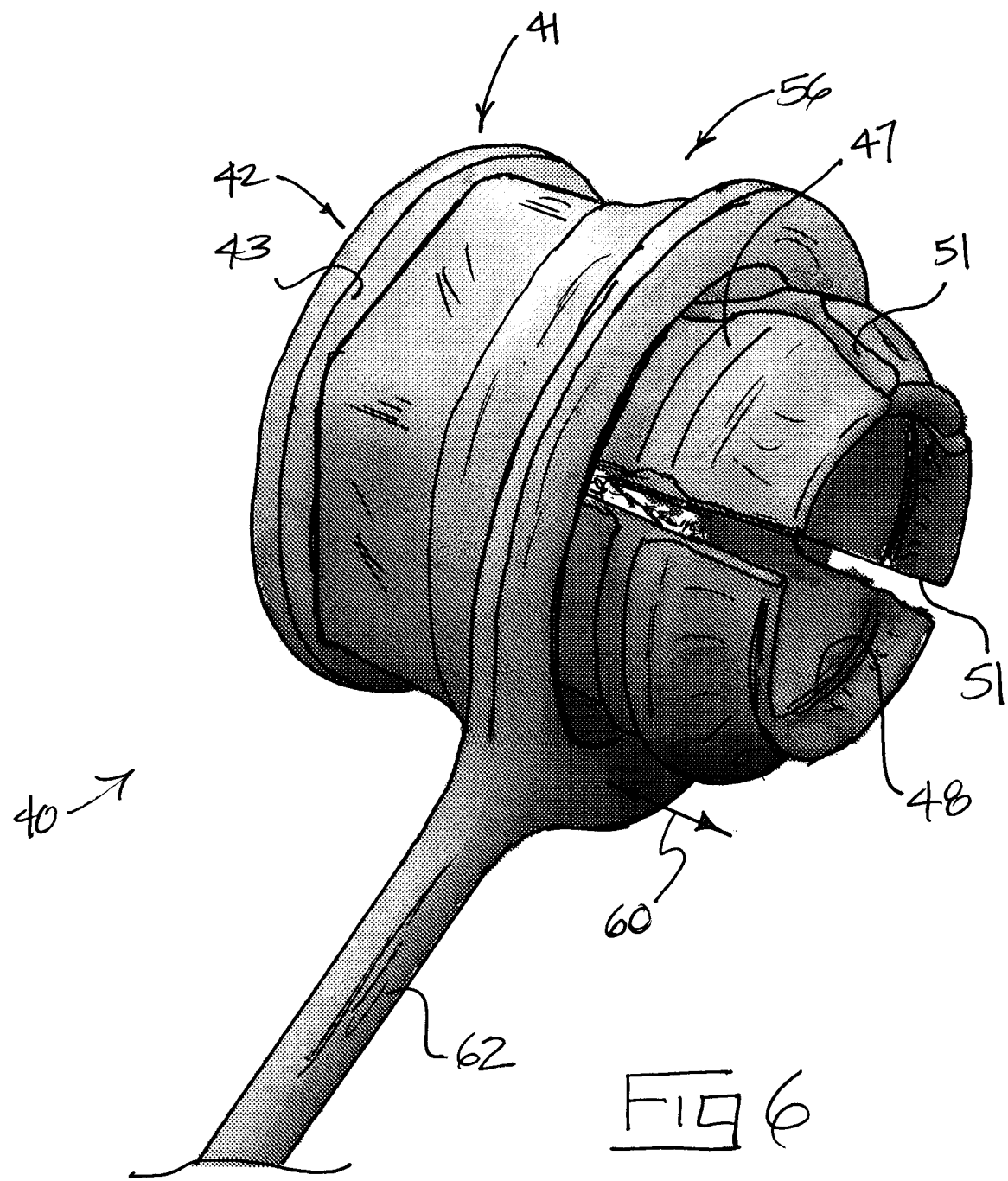
FIG. 6 is a perspective view of the locking service port cap of FIG. 5 with locking ring attached.

FIG. 6 shows the cap 41 and the locking ring 56 coupled together as a unit as they normally appear before use. The annular bulge 47 of the cap normally has a diameter slightly larger than the diameter of the passageway 55 of the locking ring such that the locking ring is captured on the cap as shown. However, the locking ring is free to move axially a limited distance on the cap as indicated by arrow 60. As mentioned above, a tether 62 may be provided to retain the assembly on a service port if dropped and may have a distal end (not visible) comprising a ring that fits around a service port to which the assembly is attached.

Figure 7:
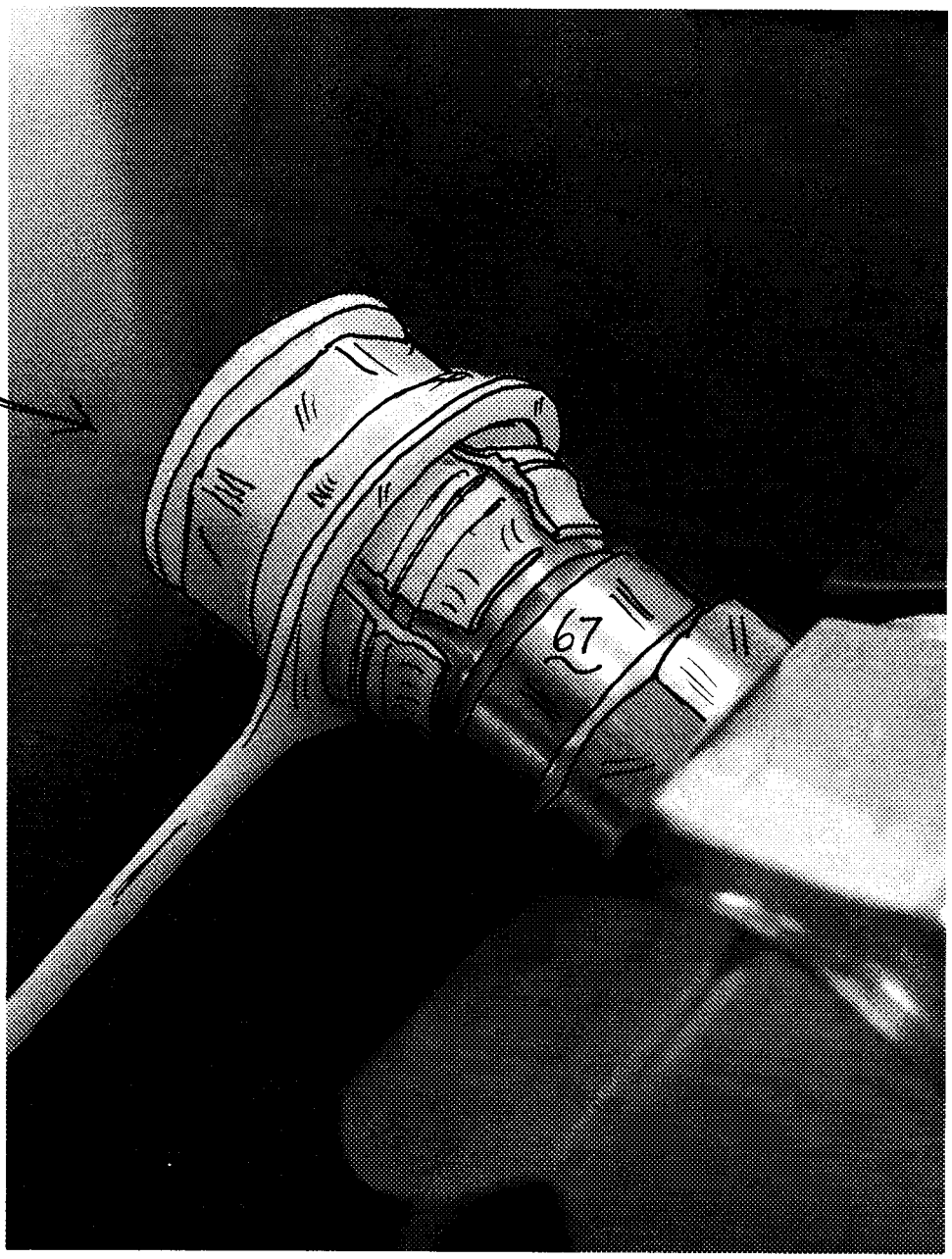
FIG. 7 is a perspective view illustrating the locking service port cap of FIG. 6 on a service port with the locking ring in its unlocked position.

FIGS. 6 and 7 illustrate the process of placing the service port cap assembly of this embodiment onto a service port and locking it in place to seal the port against leakage. First, as illustrated in FIG. 7, the assembly with the locking ring in its unlocked position against the annular rim of the gap is pressed onto the end of a service port 67. As the cap moves onto the port, the bottom end of the cap spreads over the shoulder of the port until the shoulder aligns with the annular groove on the inside of the cap. At this point, the resiliency of the material of the cap causes it to compress around the service port with the shoulder of the port nestled within the annular groove of the cap. As with the first embodiment described above, this tends to hold the cap in place until pressure within the service port exceeds an amount needed to dislodge the cap. This step may be though of as snapping the cap onto the service port.

Figure 8:
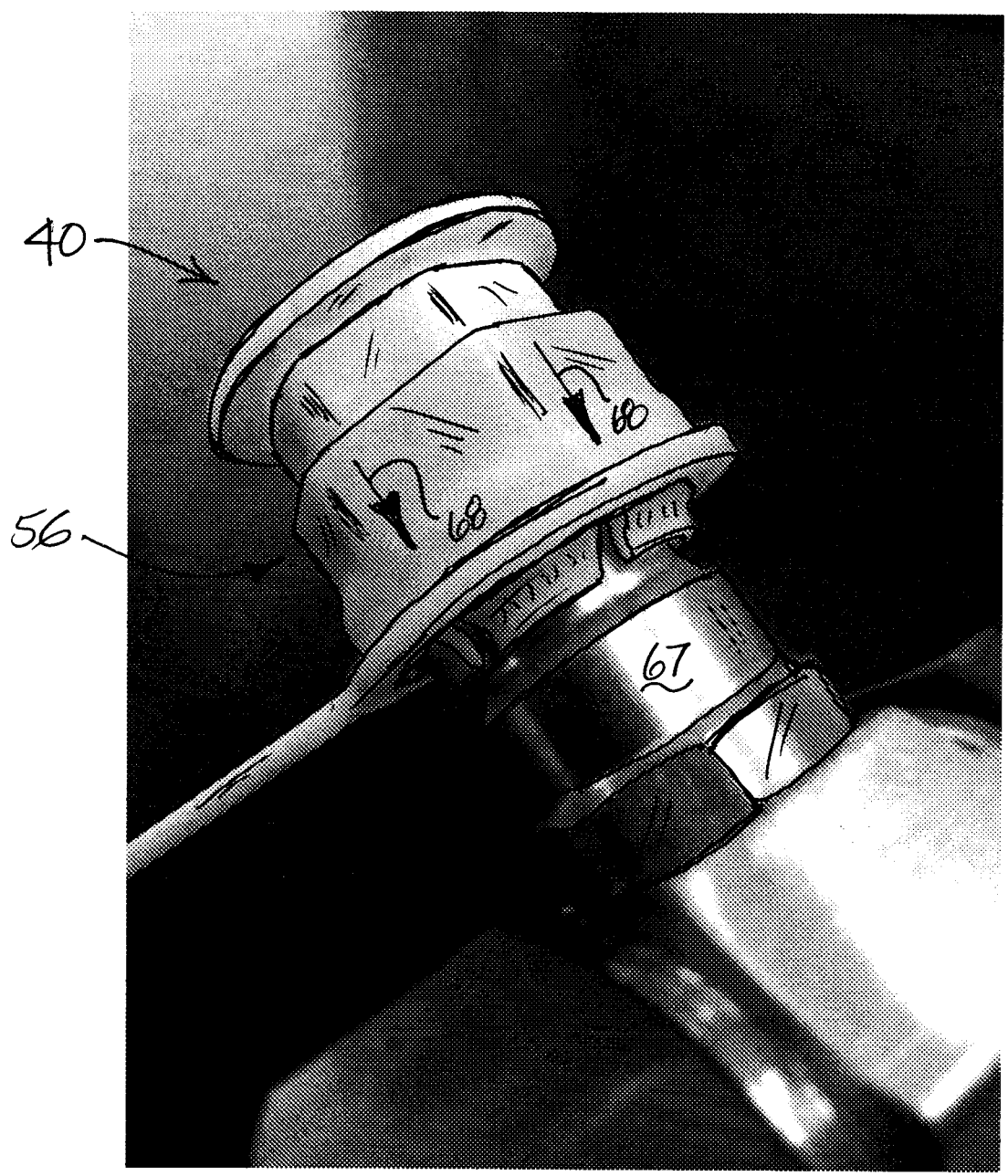
FIG. 8 is a perspective view illustrating the locking service port cap of FIG. 6 on a service port with the locking ring in its locked position.

As shown in FIG. 8, however, in the present embodiment, after the cap is snapped onto the service port, the locking ring 56 is slid downwardly over the cap in the direction indicated by arrows 68 until the radial bulge 47 around the outside of the cap clicks into the radial groove 61 on the inside of the locking ring. In this way, the locking ring "clicks" into its locking position with the annular bulge of the cap securely captured in the annular groove within the locking ring. The result is that the wings of the cap are now prevented by the locking ring from spreading apart. Consequently, even very high pressures within the service port are insufficient to dislodge the cap from the service port because the cap is locked by the locking ring onto the port. If and when it is desired to remove the cap from the service port for testing or service of the air conditioning system, the locking ring is simply un-clicked and slid upwardly toward the top of the cap, whereupon the cap can readily be removed from the service port.

It will be noted that a locking ring can be designed that moves into a locking position by being slid in the opposite direction than that indicated in FIG. 8. However, it has been found simpler and easier for an installer to press the cap onto a service port and continue pressing the locking ring in the same direction to lock the cap onto the service port. Accordingly, FIGS. 7 and 8 represent the best mode known to the inventors of carrying out this embodiment of the invention.

Figure 9:
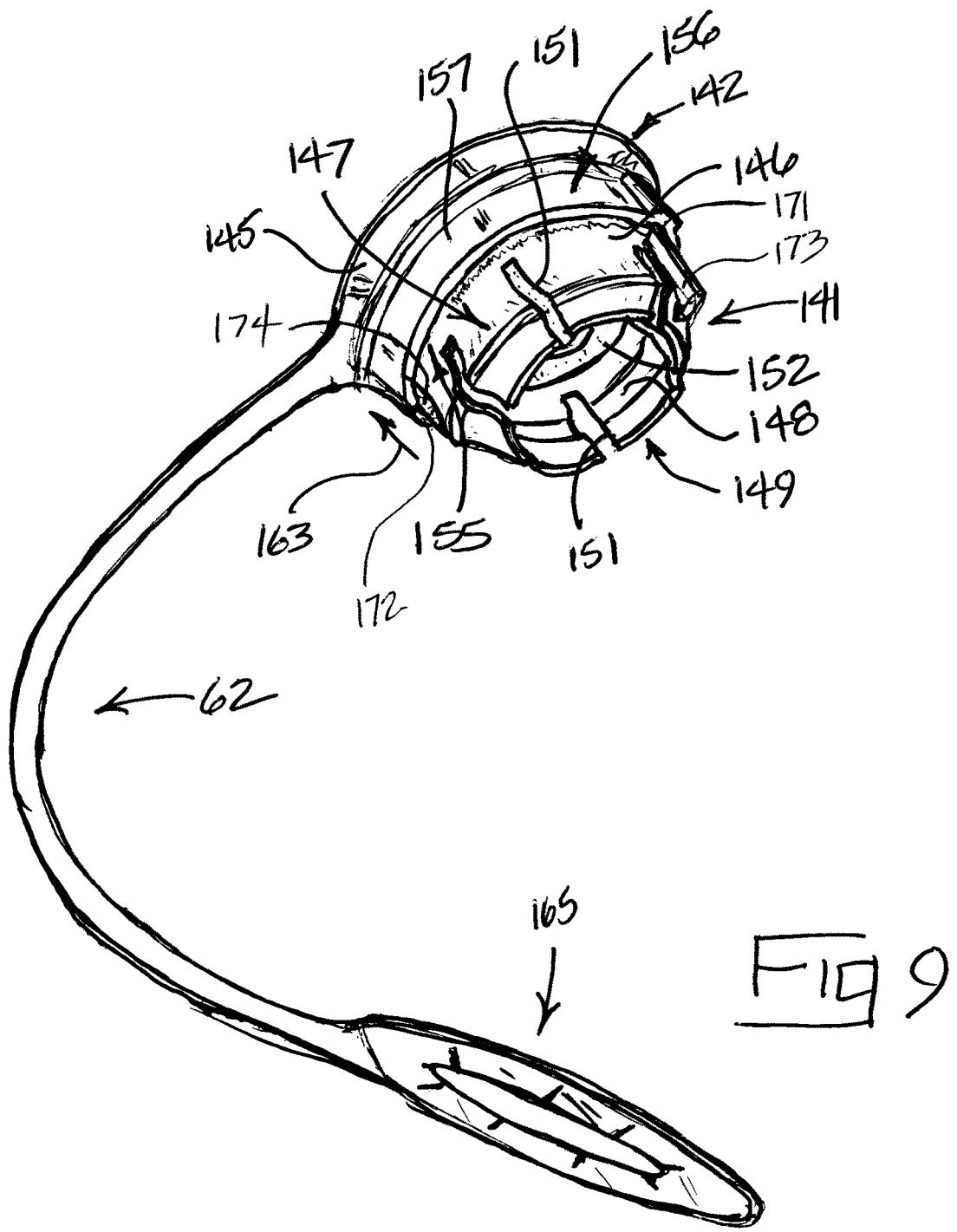
FIG. 9 is a perspective view illustrating a locking service port cap having a locking ring of an alternate embodiment in its unlocked position.
Figure 10:
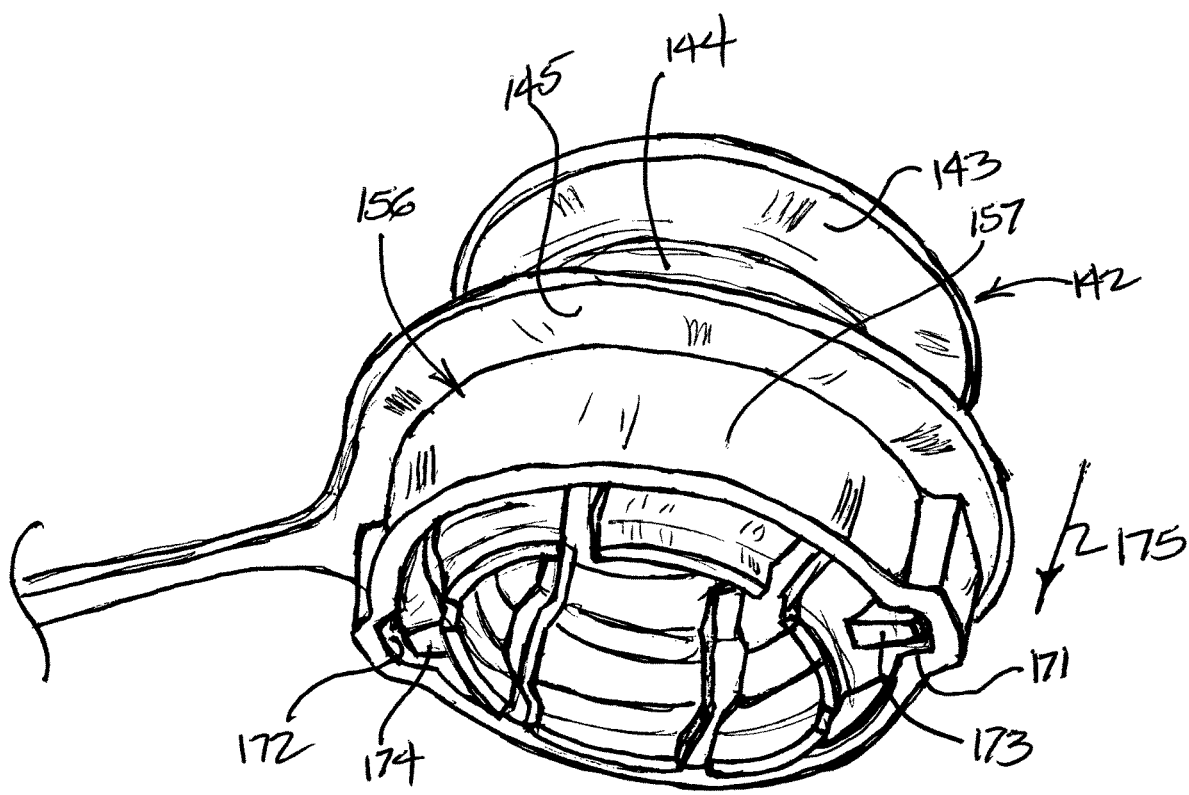
FIG. 10 is an enlarged perspective view of the locking service port cap of FIG. 9 showing the locking ring in its locked position.

FIGS. 9 and 10 illustrate an alternate embodiment of a locking service port cap according to aspects of the invention. As in the previous embodiment, the service port cap of this embodiment includes a cap body 141 having a top portion 142, a mid portion 146, and a bottom portion 149. The top portion 142 includes a radially extending disc-shaped flange 143 (FIG. 10) and a shoulder 144 (FIG. 10), which, in this embodiment, is generally cylindrical in shape. The mid portion 146 of the cap 141 has a radially outwardly extending annular bulge 147 on the outside of the cap and a corresponding annular groove 148 on the inside of the cap. The mid and lower portions of the cap include a set of axially extending slits 151 that subdivide the cap into segments that, due to the slits, can be flexes outwardly whereupon they return to their rest positions. A resilient or rubberized gasket or seal 152 is disposed in the inside top portion of the cap for engaging and sealing against the end of a service port or other kind of port on which the cap 141 is pressed.

A locking ring 156 is configured to fit slidably onto the cap 141. The locking ring 156 has a body 157 that defines a central passageway 155 and that defines an annular rim 145 at its upper end. The interior wall of the passageway is generally cylindrical in shape and sized to slide over the cylindrical shoulder 144 of the cap body. As with the previous embodiment, the interior wall is formed with an internal annular groove (not visible in FIGS. 9 and 10) sized and configured to receive the annular bulge 147 of the cap when the locking ring 156 is in position around the cap. A tether 162 may be attached to or formed with the locking ring 156 (or the cap body) and may include another end 165 that mounts onto or around a service port or that attaches to the cap if desired. The tether prevents the locking ring and the cap from becoming separated and also prevents the pair, when joined together, from being accidentally dropped into an engine compartment when being installed or removed in such a use. As shown by arrows 163, the locking ring 156 can be slid onto the cap 141 and generally is retained there by the annular bulge 147 of the cap 141.

In this embodiment, a pair of axially extending slots 171, 172 are formed in the interior wall of the central passageway 155. A pair of axially extending ribs 173, 174 projects outwardly on opposite sides of the cap 141 as perhaps best illustrated in FIG. 10. Each of the ribs 173, 174 is positioned to be received into a corresponding one of the slots 171, 172 so that the locking ring 156 can slide axially on the cap 141 without spinning an excessive amount around the cap.

FIG. 9 shows the cap 141 and the locking ring 156 coupled together as a unit as they normally appear in their unlocked positions before being locked onto a service port. The annular bulge 147 of the cap normally has a diameter slightly larger than the diameter of the passageway 155 of the locking ring such that the locking ring is captured on the cap as shown. However, the locking ring is free to move axially a limited distance on the cap. As mentioned above, a tether 62 may be provided to retain the assembly on a service port if dropped and may have a distal end 165 comprising a ring that fits around a service port or other nearby object.

FIG. 10 shows the cap and the locking ring in its locked position wherein the locking ring 156 has been slid in the direction 175 until the annular bulge of the cap has snapped into the annular groove in the interior wall of the locking ring. This action locks the locking ring in place in that position on the cap and prevents the segments of the cap from spreading, thereby locking the cap securely onto the end of a service port. To remove the cap from a service port, the locking ring need merely be slid with one's fingers in the direction 163 (FIG. 9) to un-snap the sealing ring from the annular bulge, which allows the segments to spread and thereby allow the cap to be pulled off of a service port.

The invention has been described herein in terms of preferred embodiments and methodologies considered by the inventors to represent the best mode of carrying out the invention. It will be understood by the skilled artisan; however, that a wide range of additions, deletions, and modifications, both subtle and gross, may be made to the illustrated and exemplary embodiments. For example, while the service port cap is particularly useful to cap service ports of automotive air conditioning systems, the invention is in no way limited to automotive uses. The cap may easily be adapted for use with service ports of home or commercial air conditioning systems, pneumatic pressure systems, hydraulic fluid systems, water systems, aircraft fluid and hydraulic systems, pressurized gas tanks, and generally any system where a port needs to be sealed with a cap that is reliable when locked yet easily removed and not easily lost. These and other modifications and uses may be made without departing from the spirit and scope of the invention set forth in the claims.

What is claimed is:

1. A cap fitted onto and sealing a service port:
   the service port comprising a cylindrical nipple with a first diameter and a first length at a top end, a radially projecting annular flange below the cylindrical nipple, the annular flange having a second diameter greater than the first diameter and a second length less than the first length, and a cylindrical waist below the annular flange, the cylindrical waist having a third diameter less than the second diameter and a third length less than the first length; and
   the cap comprising:
   a top portion defining a radially extending flange having a peripheral diameter;
   a mid-portion below the radially extending flange and having a diameter less than the peripheral diameter of the radially extending flange, the mid portion extending downwardly from the radially extending flange a first distance, the mid-portion defining a generally hollow cylindrical interior bounded by a wall of the mid-portion, the hollow cylindrical interior having a length substantially the same as the first length and being sized to receive the cylindrical nipple of the service port;
   an annular portion below the mid-portion and extending downwardly therefrom a second distance less than the first distance, the annular portion defining an interior annular groove bounded by a wall of the annular portion, the interior annular groove being sized to receive the annular flange of the service port;
   the wall of the annular portion defining a radially outwardly projecting bulge of the cap;
   a bottom portion below the annular portion and extending downwardly therefrom a third distance less than the first distance, the bottom portion defining a generally hollow interior bounded by a wall of the bottom portion, the wall of the bottom portion being sized to surround at least part of the waist of the service port;
   at least one slot formed in the cap extending upwardly from the bottom portion, through the annular portion, and at least partially into the mid-portion, the at least one slot extending through the walls of the bottom portion, the annular portion, and the mid portion to allow the bottom portion of the cap to spread over and past the annular flange of a service port; and
   a seal within the cap beneath the top portion, the seal being configured to engage and seal against an end of the nipple of the service port;
   a locking ring axially slidably disposed around the cap below and captured by the radially extending flange of the top portion of the cap, the locking ring being movable between an unlocked position surrounding the mid-portion of the cap and a locked position at least partially surrounding the annular portion of the cap.

2. A cap fitted onto and sealing a service port as claimed in claim 1 wherein the locking ring comprises an interior annular groove that receives the annular portion of the cap when the locking ring is in its locked position.

3. A cap fitted onto and sealing a service port as claimed in claim 1 further comprising a tether extending from the locking ring.

4. A cap fitted onto and sealing a service port as claimed in claim 3 further comprising a mounting ring formed at a distal end of the tether sized to fit around the service port to hold the locking ring and the cap to the service port.

5. A cap fitted onto and sealing a service port as claimed in claim 1 further comprising a plurality of slots formed at spaced intervals around the cap with each slot extending upwardly from the bottom portion, through the annular portion, and at least partially into the mid-portion.

6. A cap fitted onto and sealing a service port as claimed in claim 1, the cap further comprising at least one rib projecting outwardly from the mid-portion and extending in an axial direction with respect thereto and at least one cooperating slot formed along an interior surface of the locking ring, the slot receiving the rib to prevent excessive rotation of the locking ring around the cap.

7. A cap fitted onto and sealing a service port as claimed in claim 6 wherein the at least one rib comprises a pair of ribs and the at least one cooperating slot comprises a pair of cooperating slots.

8. A cap fitted onto and sealing a service port as claimed in claim 1 wherein the locking ring further comprises a radially projecting annular rim configured to be grasped by a user to move the locking ring between its locked and unlocked positions.

9. A cap fitted onto and sealing a service port cap as claimed in claim 8 wherein the radially projecting annular rim is located at a bottom portion of the locking ring.

10. A cap fitted onto and sealing a service port as claimed in claim 9 wherein the annular rim of the locking ring is generally annular and has a diameter larger than the peripheral diameter of the annular flange of the top portion of the cap.

* * * * *